Nov. 5, 1940. J. MERCIER 2,220,456
RETRACTABLE UNDERCARRIAGE
Filed April 23, 1938
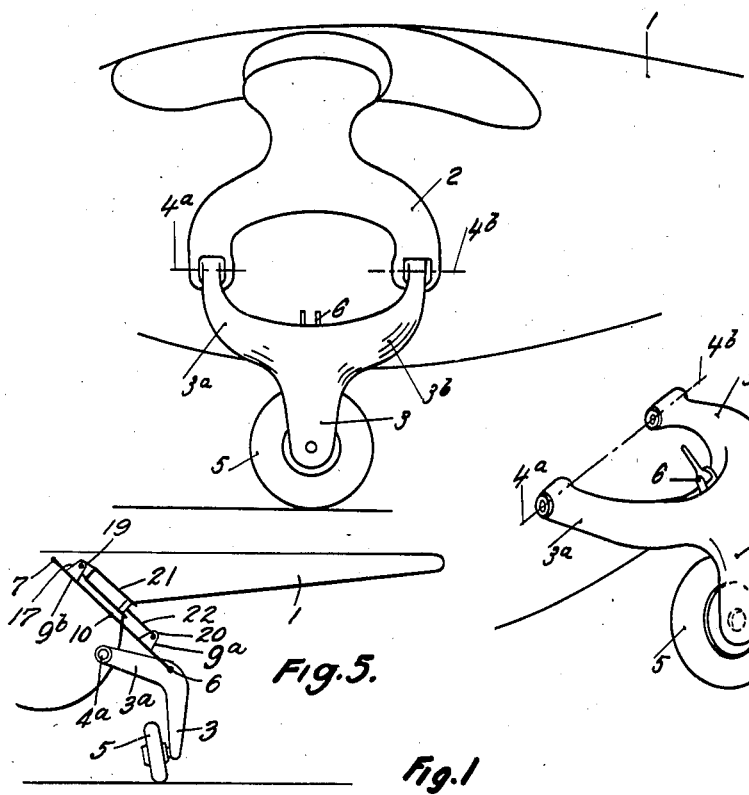
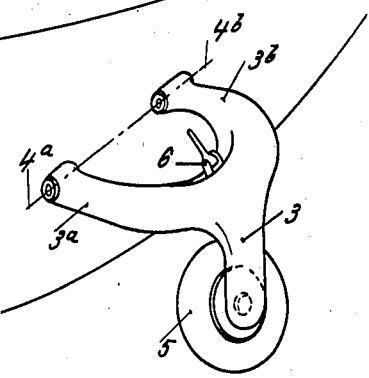
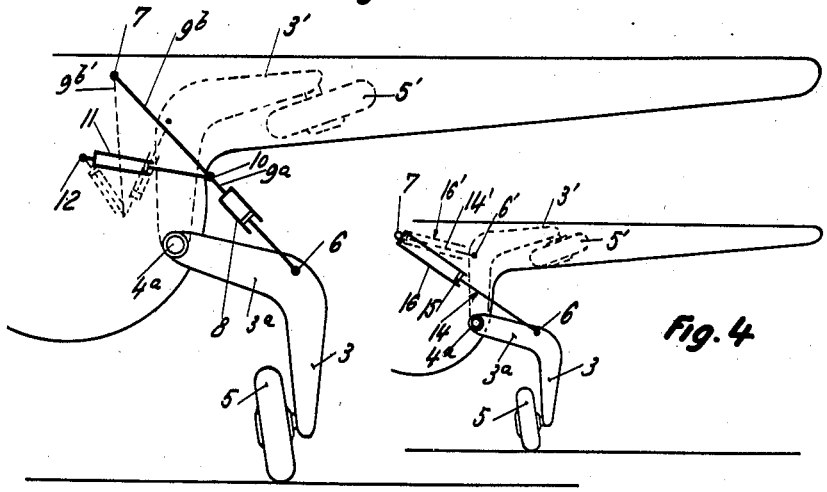
Jean Mercier
INVENTOR
his Att'y.

Patented Nov. 5, 1940

2,220,456

UNITED STATES PATENT OFFICE 2,220,456

RETRACTABLE UNDERCARRIAGE

Jean Mercier, Neuilly-sur-Seine, France

Application April 23, 1938, Serial No. 203,848
In Great Britain May 13, 1937

10 Claims. (Cl. 244—102)

The present invention relates to a retractable undercarriage for aeroplanes of the type having relatively high or medium wings.

It is a known fact that in aeroplanes of this type, the withdrawal of the undercarriage into the body of the aeroplane, and chiefly into the wing, offers great difficulties, because of the distance from the wing to the ground (when the aeroplane is resting on the ground) being quite considerable, thus requiring the use of struts of great length.

In conformity with the present invention, the undercarriage is so arranged as to avoid said drawbacks by very simple means. According to one feature of the present invention the undercarriage is chiefly characterized in that each wheel or other landing part is suspended from the lower part of a right-angled device having the shape of a fork, which is pivotally mounted on the lower part of the fuselage of the aeroplane or the like, by means of arms which are more or less horizontal when in the landing position, each fork or like device being further connected at its upper part, and preferably near the elbow, with the fuselage or the like, by means of a strut which may be actuated by driving means of the pneumatic, hydraulic, electric or other type, thus bringing the undercarriage into its position for flight or for landing.

The strut is further provided with a damping device, for instance of the piston and cylinder type, serving to damp the stresses exerted upon the wheels and to transmit them in an attenuated state to the aeroplane body. The right-angled fork carrying the wheels, landing skids or the like, is further arranged in such manner that when the said strut is folded up, the arms of the fork which are pivoted to the aeroplane body will be at least partly concealed into the fuselage, whereas the arm of the fork carrying the wheel is concealed together with this latter, and possibly with a part of the arms of the fork pivoted to the fuselage, in the wing.

An undercarriage of this construction is extremely simple and strong, owing to the fact that save for the right-angled fork, it contains but a single supporting strut which can be folded up and which itself forms part of the damping device. On the other hand, the said strut is relatively short, and thus during the various operations, the several pivoting points of the system are only obliged to move through relatively short distances.

The said fork preferably consists of hollow tubes of large diameter, thus affording a great strength for a reduced weight.

In the accompanying drawing, which are given solely by way of example:

Fig. 1 is a diagrammatic front view showing one-half of an aeroplane of the high wing type, comprising an undercarriage according to the invention.

Figs. 2 and 3 are respectively a side view and a perspective view showing, in greater detail, a form of construction of the tubular right-angled fork.

Fig. 4 is a view, analogous to Fig. 1, showing a modification.

Fig. 5 shows another arrangement of the device according to the invention.

In the embodiment herein represented, the fuselage of the aeroplane is represented at 1, the wings at 2 and the right-angled forked member at 3. The said fork carries a wheel, a skid or the like 5, pertaining to the undercarriage, and is pivoted by means of arms $3^a$—$3^b$ (Fig. 2) at $4^a$—$4^b$, to the fuselage, and preferably to the lower part of this latter.

The fork is pivoted at 6, approximately at the meeting point of 3—$3^a$—$3^b$, to a strut whose other end 7 is pivoted for instance to the upper part of the fuselage. The said strut comprises a shock-absorbing device 8 of the cylinder and piston type, and a spring or the like which transmits, after damping them, the stresses which are exercised upon the wheel 5. The said strut consists of two parts $9^a$—$9^b$ which are pivoted together at 10. The pivoting point 10 is acted upon directly or indirectly by a driving device adapted to fold up or to open out the strut $9^a$—$9^b$ in order to bring the undercarriage into the flying position (in which it is withdrawn into the fuselage) or into the landing position.

In the present embodiment, the driving device consists of a jack 11 whose cylinder is pivoted for instance to the point 10 of the strut, and whose piston rod is pivoted to the fuselage at 12. By a suitable operation of the jack, by means of a fluid under pressure (gas or liquid), the undercarriage can be brought into the position for flight or for landing. As shown in Fig. 1, in the flying position (shown in the dotted lines, the reference numerals having an index ′) the arms $3^a$—$3^b$ of the fork are for the most part concealed in the fuselage of the aeroplane, whilst the part 3 of the fork and the wheel 8 are contained in the wing 2.

Fig. 4 shows another form of undercarriage in conformity with the invention. In this construction, the jointed strut 9ª—9ᵇ is replaced by a strut comprising a bar 14 which is pivoted at 6 to the fork 3 and which carries at its other end a piston 15 operating in a cylinder 16 pivoted at 7 to the fuselage. The cylinder 16 and the piston 15 thus form a jack by means of which the undercarriage can be folded or spread out. The withdrawn position is shown by the dotted lines. Obviously, the jack is of such construction that the stroke of the piston 15 shall be sufficient to ensure the withdrawal of the undercarriage.

It is evident that the invention is not limited to the embodiment herein described and represented, which is given solely by way of example. Thus, instead of using a pneumatic or hydraulic driving device, use can be made of a mechanical or electrical device in order to move the undercarriage into the position for flight or landing. Instead of having two arms 3ª—3ᵇ the fork may comprise a greater number of arms, or it may have only a single arm, and chiefly in the case of light aeroplanes of the sporting type. On the other hand, the strut 9ª—9ᵇ may be pivoted at another point than upon the fuselage of the aeroplane, but the arrangement of the various pivoting points will always be such that at least a portion of the arms 3ª—3ᵇ will remain within the fuselage, and that the part 3 of the fork, with the wheel 5, will be situated within the wing when the undercarriage is in the flying position.

It will be noted that the said landing arrangement provides for a ready and convenient withdrawal of the undercarriage, even in the case of aeroplanes with very short wings.

In like manner, the damping device 8, need not be mounted upon the jointed strut, as shown in Fig. 1, but it may be formed in the lower part 3 of the fork 3ª—3—3ᵇ, near the wheel 5, in such way that the stresses upon the wheel shall be transmitted directly to the device 8 without the use of the intermediate strut 9—9ª. This will also permit of reducing the stresses exerted upon the joints 4ª and 4ᵇ.

Fig. 5 shows another arrangement in which the strut 9ª—9ᵇ is pivoted at 6 and at 7 and comprises a central pivot 10. Elements 9ª—9ᵇ carry lugs 17 and 18 on which are pivotally mounted at 19 and 20 a cylinder 21, and a piston 22 forming a jack. In this arrangement the jack is entirely independent of the fuselage and of the wings and is directly mounted on the strut.

Having now described my invention, what I claim as new and desire to secure by Letters Patent is:

1. A retractable undercarriage for aircraft of the type having a fuselage and relatively high wings, comprising a rigid curved piece provided at one end with forked parts and substantially mating with the angle formed between the fuselage and wings of the aircraft in the retracted position of the undercarriage landing means carried by the other end of said piece, said rigid piece being pivotally connected by these forked parts with the fuselage, folding strut like parts transmitting the control stresses to said rigid piece and pivoted at one end on the fuselage and at the other end to the upper portion of said single rigid piece and near the curved parts thereof, said strut like parts being adapted and arranged to cause said single rigid piece to turn about the pivots of said fork by an angle of substantially 90° and driving means actuating said strut like parts.

2. A retractable undercarriage for aircraft of the type having a fuselage and relatively high wings, comprising a single curved piece provided at one end with forked parts and substantially mating with the angle formed between the fuselage and wings of the aircraft in the retracted position of the undercarriage, landing means carried by the other end of said piece, said rigid piece being pivotally connected by these forked parts with the fuselage and, folding strut like parts transmitting the control stresses to said single rigid piece and pivoted at one end on the fuselage and at the other end to the upper portion of said rigid piece and near the curved parts thereof, said strut like parts being adapted and arranged to cause said single rigid piece to turn about the pivots of said fork by an angle of substantially 90° and to conceal the landing members in the fuselage and in the wings, and driving means actuating said strut like parts, either of said strut like parts consisting of two pivoted elements and said driving means acting upon the pivot between said latter elements.

3. An undercarriage as claimed in claim 1, wherein said strut like parts are pivoted on the fuselage at a point located at the upper part thereof.

4. A retractable undercarriage for aircraft of the type having a fuselage and relatively high wings, comprising a rigid curved piece provided at one end with forked parts and substantially mating with the angle formed between the fuselage and wings of the aircraft, landing means carried by the other end of said piece, said rigid piece being pivotally connected by these forked parts with the fuselage, folding strut like parts transmitting the control stresses to said rigid piece and pivoted at one end on the fuselage and at the other end to the upper portions of said single rigid piece and near the curved parts thereof, said strut like parts being adapted to cause said rigid piece to turn about the pivots of said fork by an angle of substantially 90° and to conceal the landing members in the fuselage and in the wings, and driving means actuating said strut like parts, the pivoting points of said strut, said rigid curved piece and said driving means having such an arrangement, that said rigid curved piece is adapted to have its forked part in a practically horizontal position when the undercarriage is expanded and to have it at least in part concealed in the fuselage when the undercarriage is retracted, the remainder of said forked part together with the landing members being then concealed in the wings.

5. An undercarriage according to claim 4, wherein said strut incorporates the driving means and consists of a cylinder and piston arrangement, the cylinder being pivoted to the fuselage, and the piston rod to the forked part of the single rigid curved piece bearing the usual landing members.

6. An undercarriage according to claim 4, wherein a damping device is provided on one part of said strut.

7. An undercarriage as claimed in claim 1, wherein the said forked part of the said single rigid curved piece preferably consists of hollow metallic parts.

8. A retractable undercarriage for aircraft of the type having a fuselage and relatively high wings, comprising a rigid curved piece provided at one end with forked parts and substantially mating with the angle formed between the fuselage and wings of the aircraft in the retracted position of the undercarriage, landing means carried by the other end of said piece said rigid piece being pivotally connected by these forked parts with the fuselage, folding strut like parts transmitting the control stresses to said rigid piece and pivoted at one end on the fuselage and at the other end to the upper port of said rigid piece and near the curved parts thereof, said strut like parts being adapted and arranged to cause said elements to turn about the pivots of said fork by an angle of substantially 90° and to conceal the landing members in the fuselage and in the wings and driving means actuating said strut like parts, said driving means consisting preferably of a jack which is mounted on the jointed strut without any mechanical and kinematic connection with the aircraft body itself.

9. An undercarriage as claimed in claim 1, wherein a shock-absorbing device is inserted between the parts of the jointed strut.

10. An undercarriage as claimed in claim 1, wherein said strut consists of a rigid bar which is pivotally mounted at one of its ends on the single rigid curved piece near the curved parts thereof, the other end being connected with said driving means, such as a jack, which is pivoted to the aircraft body, and provides for the lowering and retracting of the undercarriage.

JEAN MERCIER.